(12) United States Patent
Jeng et al.

(10) Patent No.: US 7,583,253 B2
(45) Date of Patent: Sep. 1, 2009

(54) APPARATUS FOR AUTOMATICALLY ADJUSTING DISPLAY PARAMETERS RELYING ON VISUAL PERFORMANCE AND METHOD FOR THE SAME

(75) Inventors: Shie-Chang Jeng, Hsinchu (TW); Yan-Rung Lin, Hsinchu (TW); Chi-Chang Liao, Hsinchu (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 160 days.

(21) Appl. No.: 11/398,629

(22) Filed: Apr. 6, 2006

(65) Prior Publication Data

US 2007/0159470 A1 Jul. 12, 2007

(30) Foreign Application Priority Data

Jan. 11, 2006 (TW) ............................. 95101015 A

(51) Int. Cl.
*G09G 5/00* (2006.01)
(52) U.S. Cl. .......................................... 345/156; 345/7
(58) Field of Classification Search ................ 345/204, 345/690, 696, 156, 127–131
See application file for complete search history.

(56) References Cited

U.S. PATENT DOCUMENTS

| | | | | |
|---|---|---|---|---|
| 5,686,940 A | * | 11/1997 | Kuga ........................... | 345/156 |
| 5,712,965 A | * | 1/1998 | Fujita et al. ................... | 345/419 |
| 6,002,386 A | * | 12/1999 | Gu .............................. | 345/690 |
| 6,567,101 B1 | * | 5/2003 | Thomas ........................ | 345/649 |
| 6,577,319 B1 | * | 6/2003 | Kashiwagi et al. ........... | 345/581 |
| 6,912,664 B2 | * | 6/2005 | Ranganathan et al. ....... | 713/320 |
| 6,917,368 B2 | * | 7/2005 | Credelle et al. ............. | 345/589 |
| 7,203,911 B2 | * | 4/2007 | Williams ..................... | 715/864 |
| 7,233,312 B2 | * | 6/2007 | Stern et al. .................. | 345/156 |
| 7,345,684 B2 | * | 3/2008 | Gardos ........................ | 345/204 |
| 2003/0093600 A1 | * | 5/2003 | Perala et al. .................. | 710/72 |
| 2003/0095155 A1 | * | 5/2003 | Johnson ....................... | 345/864 |

FOREIGN PATENT DOCUMENTS

CN 02150679.5 5/2003

* cited by examiner

*Primary Examiner*—Kevin M Nguyen
(74) *Attorney, Agent, or Firm*—Bacon & Thomas, PLLC

(57) ABSTRACT

The present invention provides an apparatus for automatically adjusting display parameters relying on visual performance and its method. The present apparatus includes a display, a detecting system and a control system. The detecting system is disposed in a predetermined position to detect visual performance of a user operating the display. The control system adjusts the display parameters according to the visual performance variation of the user. As such, the user can comfortably operate the display for long and the visual fatigue is reduced.

20 Claims, 5 Drawing Sheets

| Viewing Distance Variation | Brightness Weighting Value | Contrast Weighting Value | Font Size Weighting Value | • • • • • • |
|---|---|---|---|---|
| $\Delta d_1$ | $a_1$ | $b_1$ | $c_1$ | |
| $\Delta d_2$ | $a_2$ | $b_2$ | $c_2$ | |
| $\Delta d_3$ | $a_3$ | $b_3$ | $c_3$ | |
| $\Delta d_4$ | $a_4$ | $b_4$ | $c_4$ | • • • • • • |
| • | • | • | • | |
| • | • | • | • | |
| • | • | • | • | |
| • | • | • | • | |
| • | • | • | • | |
| $\Delta d_n$ | $a_n$ | $b_n$ | $c_n$ | |

| Viewing Distance Variation | Brightness Weighting Value | Contrast Weighting Value | Font Size Weighting Value | ...... |
|---|---|---|---|---|
| $\triangle d_1$ | $a_1$ | $b_1$ | $c_1$ | |
| $\triangle d_2$ | $a_2$ | $b_2$ | $c_2$ | |
| $\triangle d_3$ | $a_3$ | $b_3$ | $c_3$ | |
| $\triangle d_4$ | $a_4$ | $b_4$ | $c_4$ | |
| ⋮ | ⋮ | ⋮ | ⋮ | ...... |
| $\triangle d_n$ | $a_n$ | $b_n$ | $c_n$ | |

Fig. 4A

| Blinking Rate Variation | Brightness Weighting Value | Contrast Weighting Value | Font Size Weighting Value | ...... |
|---|---|---|---|---|
| $\triangle f_1$ | $a_1'$ | $b_1'$ | $c_1'$ | |
| $\triangle f_2$ | $a_2'$ | $b_2'$ | $c_2'$ | |
| $\triangle f_3$ | $a_3'$ | $b_3'$ | $c_3'$ | |
| $\triangle f_4$ | $a_4'$ | $b_4'$ | $c_4'$ | |
| ⋮ | ⋮ | ⋮ | ⋮ | ...... |
| $\triangle f_n$ | $a_n'$ | $b_n'$ | $c_n'$ | |

Fig. 4B

| Eye Movement Variation | Brightness Weighting Value | Contrast Weighting Value | Font Size Weighting Value | · · · · · · |
|---|---|---|---|---|
| $\triangle m_1$ | $a_1''$ | $b_1''$ | $c_1''$ | |
| $\triangle m_2$ | $a_2''$ | $b_2''$ | $c_2''$ | |
| $\triangle m_3$ | $a_3''$ | $b_3''$ | $c_3''$ | |
| $\triangle m_4$ | $a_4''$ | $b_4''$ | $c_4''$ | · · · · · · |
| ⋮ | ⋮ | ⋮ | ⋮ | |
| $\triangle m_n$ | $a_n''$ | $b_n''$ | $c_n''$ | |

Fig. 4C

APPARATUS FOR AUTOMATICALLY ADJUSTING DISPLAY PARAMETERS RELYING ON VISUAL PERFORMANCE AND METHOD FOR THE SAME

BACKGROUND OF THE INVENTION

1. Field of the Invention

The present invention relates to an apparatus for automatically adjusting display parameters, and more particularly to an apparatus for automatically adjusting display parameters relying on visual performance and its method.

2. Description of the Related Art

Vision is the primary navigating system of human body, which provides 80% to 90% information for a human in his whole life. The improvement of visual technologies affects human activities and performance in all aspects. As the exponential growth of demands in present social education and working, human vision system works in a more difficult environment. Computer becomes a primary solution to provide service and information, the population of using computers in working, family, shopping and news reading grows rapidly, and also the services and information provided from computers increasingly grow. As the exploding growth of the use of the computers and other visual information gathering activities, the demands of visual systems grows greatly. Visual Display Terminal (VDT) is the primary medium for human to communicate with the computer, and Cathode Ray Tube (CRT) is the most popular VDT. But CRT is restrained in portable products due to its bulkiness and other disadvantages. Flat Panel Display (FPD) already overcomes a lot of drawbacks of CRT and associates with a notebook and word processor in many working fields. As such, FPD becomes an electronic device the modern people use every day. However, the display parameter settings, like brightness and contrast, can not meet each user's demands. The user's visual performance is reduced as time for using the display increases, even bringing serious visual fatigue.

Generally the display parameter adjustment is for the purpose of reducing power consumption. The power supply or backlight is turned on or turned off depending on whether or not the display is being used. Otherwise, the intensity of the backlight is adjusted in accordance with the environmental illumination so as to save power. Alternatively, the display parameters are manually adjusted depending on the individual favor. However, this is not most appropriate for human eyes.

Accordingly, it is desired to develop a display whose display parameters can be adjusted at any time in accordance with an individual visual demand.

SUMMARY OF THE INVENTION

One objective of the present invention is to provide an apparatus for automatically adjusting display parameters relying on visual performance and method for the same, which utilizes a detecting system to detect visual performance variation of a user, and automatically adjusts display parameters in accordance with the visual performance of the user, so that the user can comfortably operate the display for a long time, and the user's eyes can be protected.

It is another objective of the present invention to provide an apparatus for automatically adjusting display parameters relying on visual performance and method for the same, which adjusts the display parameters in an optimum setting at any time in accordance with the visual performance of a user to avoid unnecessary power consumption.

According to the above objectives, the present invention provides an apparatus for automatically adjusting display parameters relying on visual performance, which includes a display, a detecting system and a control system. The detecting system is disposed in a predetermined position to detect visual performance of a user operating the display. The control system has a mapping table of visual performance variations vs. display parameters. The control system adjusts the display parameters in accordance with the visual performance variation of the user and the mapping table.

In one another aspect, the present invention provides a method for automatically adjusting display parameters relying on visual performance, comprising: detecting an initial visual performance of a display user; continuously detecting visual performance of the user; judging whether the visual performance of the user is changed, if the visual performance is not changed, repeating the previous steps, and if the visual performance is changed, determining a visual performance variation; and adjusting the display parameters relying on a mapping table of visual performance variations vs. display parameters.

The apparatus and method of the present invention adjust display parameters in optimum settings at any time in accordance with the visual performance of the user so as to enable the user comfortably use the display in a long time.

BRIEF DESCRIPTION OF THE DRAWINGS

FIG. 4A shows a mapping table of viewing distance variations vs. display parameters of the present invention.

FIG. 4B shows a mapping table of blinking rate variations vs. display parameters of the present invention.

FIG. 4C shows a mapping table of eye movement velocity variations vs. display parameters of the present invention.

DETAILED DESCRIPTION OF THE PREFERRED EMBODIMENTS

The study of human visual performance on a display find that the user's visual performance or visual fatigue when using the display can be identified in several phenomena, such as change of viewing distance, blinking rate or eye movement velocity. By detecting these changes with detectors and feedback to the display system, the display parameters can be accordingly adjusted, and the user have an optimum and most comfortable human vision. Furthermore, display parameter, such as brightness, contrast, font size in relation to viewing distance, font, font and color combination, etc. Each of which has its own international standard and recommendation value or recommendation value as a result of the human factors studies in literatures. For example, ISO13406-2 has recommendation value for font size as shown in Table 1. When the display system detects the visual performance is getting worse, like the viewing distance becomes shorter or the blinking rate becomes higher, the font size will be changed from a predetermined value to a superior recommendation value so as to protect the user's eyes. Other display parameters also can be adjusted in the same way. The present invention adopts a detector to continuously detect visual performance of the user operating the display, and automatically adjusts the display parameters in accordance with the user's visual performance. As such, the display would always be in a status appropriate for viewing, and furthermore the user's eyes can be protected.

TABLE 1

| Font | Least font size for reading | Superior font size for reading |
|---|---|---|
| Latin | 16' | 20' to 22' |
| Asia | 25' | 30' to 35' |

The apparatus for automatically adjusting display parameters relying on visual performance of the present invention includes a display, a detecting system and a control system. The display is used to display information for a user to read. The detecting system is positioned in a non-display area of the display to detect visual performance of the user, or the detecting system is positioned in a predetermined position to advantageously detect visual performance of the user. The control system has a mapping table of visual performance variations vs. display parameters. The control system adjusts the display parameters in accordance with the visual performance and the mapping table. The present apparatus for automatically adjusting display parameters relying on visual performance will be described in detail in accordance with the following embodiments and accompanying drawings.

Figure 1:
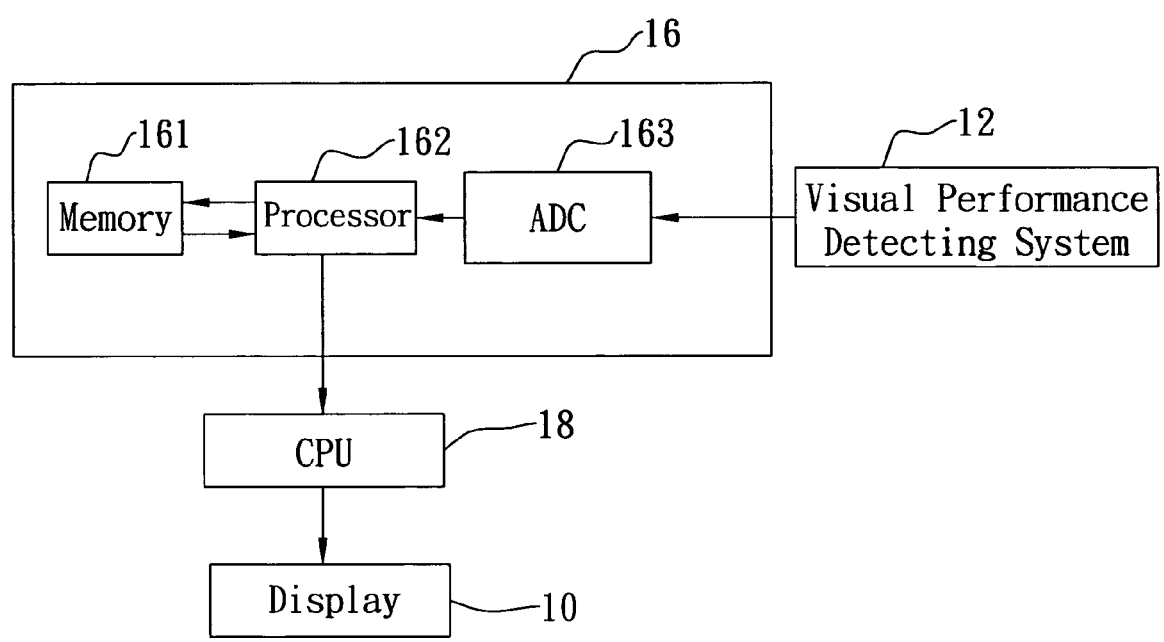
FIG. 1 shows a functional block diagram of an apparatus for automatically adjusting display parameters relying on visual performance according to an embodiment of the present invention.
Figure 2A:
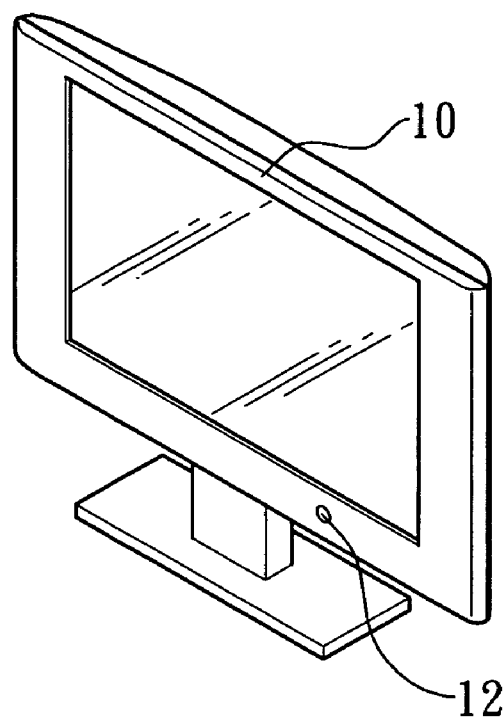
FIG. 2A shows a schematic perspective view of a display associated with a viewing distance detecting system of the present invention.
Figure 2B:
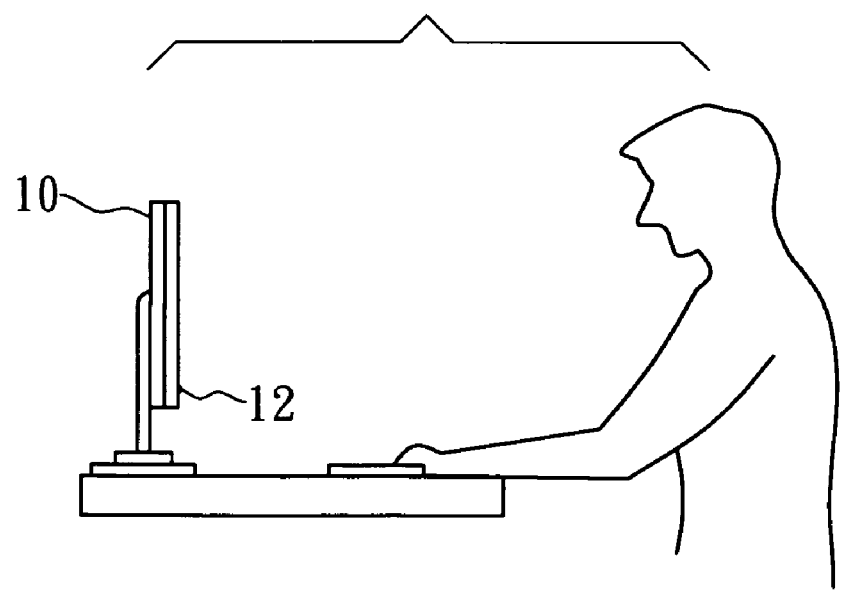
FIG. 2B shows a use status of the display of FIG. 2A.

FIG. 1 shows a functional block diagram of an apparatus for automatically adjusting display parameters relying on visual performance of the present invention, which includes a display 10, a visual performance detecting system 12 and a control system 16. The control system 16 further comprises a memory 161, a processor 162 and an analog-to-digital converter 163. The control system 16 electrically connects to a CPU (Central Processing Unit) 18 of a computer to adjust the display parameters, such as brightness, contrast, font, font size, etc. In the present invention, the visual performance detecting system 12 can be a viewing distance detecting system, a blinking rate detecting system or an eye tracking system. The viewing distance detecting system is used to detect the viewing distance variation of the user operating the display 10, and the viewing distance variation is an indicator of visual performance. Referring to FIG. 2A, the viewing distance detecting system 12 can be a light transmitting/receiving detecting system, a sonic ranging system or an image sensor, and positioned in a non-display area of the display 10. Referring to FIG. 2B, the light transmitting/receiving detecting system includes a light transmitter to project light upon the user and a light receiver to receive the reflection light from the user. The viewing distance variation is determined based on the relationship that the viewing distance is inversely proportional to the intensity of the reflection light. Furthermore, the present invention also can use a sonic ranging system as the viewing distance detecting system. The user's viewing distance or its variation can be determined by detecting the arrival time of the reflected sonic wave and based on the relationship that the arrival time of the reflected sonic wave is proportional to the viewing distance.

In one another aspect, the present invention also can use an image sensor as the visual performance detecting system 12, and analyzing the user's viewing distance or blinking rate by processing image data captured from the user.

Referring to FIG. 1 again, the visual performance detecting system 12 can be an eye tracking system. By processing the image data captured from the user, the eye movement velocity of the user can be determined.

Figure 3B:
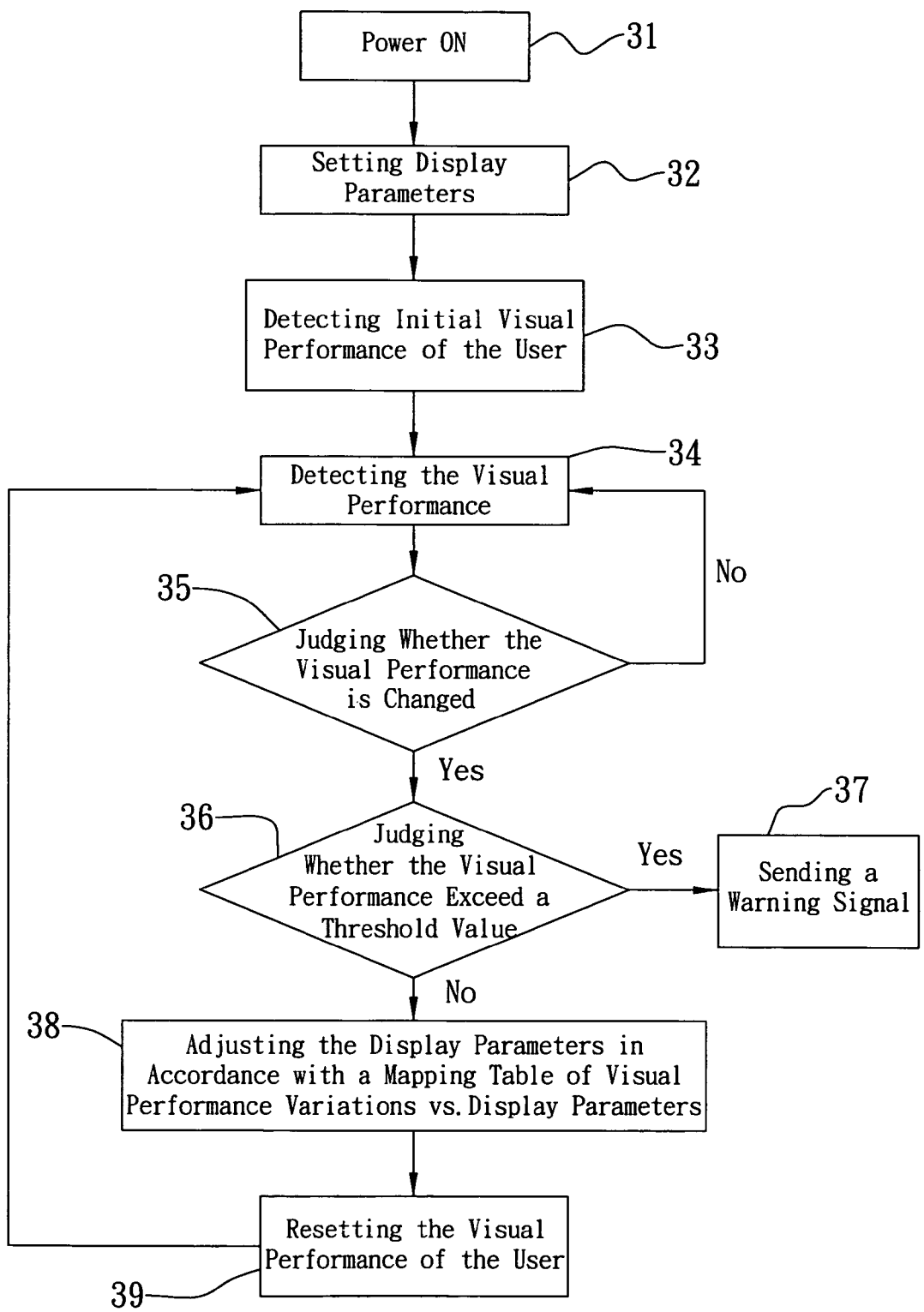
FIG. 3B shows a flow chart of a method for automatically adjusting display parameters relying on visual performance of the present invention.

FIG. 3 shows a flow chart of a method for automatically adjusting display parameters relying on visual performance of the present invention. With reference to FIG. 1 and FIG. 3, the method for automatically adjusting display parameters relying on visual performance of the present invention will be described in detail in the following. First of all, at step 31, the display 10 is powered on. And, at step 32, the display parameters of the display 10, such as brightness, contrast, font and font size, are set by the user (or the display parameters are set in the default values). Next, at step 33, detecting an initial visual performance of the user operating the display 10 and transmitting the initial visual performance to the analog-to-digital converter 163 of the control system 16 to convert to a set of digital values, and then being stored in the memory 161 as a visual performance setting value. In addition, the present invention can use the user's blinking rate as the visual performance, and using a blinking rate detector to detect an initial blinking rate of the user, and transmits the initial blinking rate signal to the analog-to-digital converter 163 of the control system 16 to convert to a set of digital signals, and storing the digital signals in the memory 161 as an initial blinking rate. Moreover, the present invention can use the user's eye movement velocity as visual performance, and adopting an eye movement velocity detector to detect an initial eye movement velocity of the user, and transmits the eye movement velocity signal to the analog-to-digital converter 163 of the control system 16 to convert to a set of digital signals and storing in the memory 161 as an initial eye movement velocity. Then, at step 34, detecting the user's visual performance, such as the viewing distance, blinking rate or the eye movement velocity, and transmitting to the analog-to-digital converter 163 to convert to a set of digital signals, and transmitting the digital signals to the processor 162 and storing in the memory 161.

At step 35, the processor 162 judges whether the user's visual performance is changed in accordance with the initial visual performance stored in the memory 161, such as whether or not the viewing distance is shortened, the blinking rate is increased, or the eye movement velocity is increased. If the user's visual performance is not changed, returns to step 34, and continue to detect the user's visual performance. If the user's visual performance is changed, go to step 36, the processor 162 judges whether the visual performance exceeds a threshold value which is stored in the memory 161. If the visual performance exceeds the threshold value, like the viewing distance is less than a minimum value or the blinking rate or eye movement velocity is higher than a maximum value, go to step 37, the processor 162 activates an alarm (not shown) to send a warning signal to remind the user to take a rest. If the visual performance does not exceed the threshold value, go to step 38, the processor 162 obtains a group of value ($a_i$) in accordance with a mapping table of visual performance variations vs. display parameters and one visual performance formula $P=\Sigma a_i X_i$ ($X_i$ is a parameter of brightness, contrast, font size, font, etc, and $a_i$ is the weighting value of $X_i$), and accordingly adjusting the parameters of display 10, such as brightness, contrast or font size. When the viewing distance is used as the user's visual performance, a mapping table of viewing distance variations vs. display parameters is adopted, as shown in FIG. 4A. At step 38, a viewing distance variation can be determined by detecting a viewing distance and a preset value stored in the memory 161, and then obtaining the corresponding brightness weighting value $a_1$, contrast weighting value $b_i$, font size weighting value $c_i$, and other display parameter weighting value from the mapping table of the visual performance variations vs. display parameters. The processor 162 adjusts brightness, contrast, font size, and other parameters by these weighting values. As such, the present method can adjust parameters of the display 10 to the optimum settings in accordance with the user's viewing distance at present time. When a blinking rate is used as the user's visual performance, a mapping table of blinking rate variations vs. display parameters is adopted, as shown in FIG. 4B. At step 38, a blinking rate variation is determined by detecting a blinking rate and a preset value stored in the memory 161, and then obtaining the corresponding brightness weighting value $a'_i$, contrast weighting value $b'_i$, font size weighting value $c'_i$ and other display parameter weighting value from the mapping table of blinking rate variations vs. display parameters. The processor 162 adjusts brightness, contrast, font size, and other parameters in accordance with the weighting values. As such, the present method can adjust parameters of the display 10 to the optimum settings in accordance with the user's blinking rate. When an eye movement velocity is used as the user's visual performance, a mapping table of eye movement velocity variation vs. display parameters is adopted, as shown in FIG. 4C. At step 38, an eye movement velocity variation can be determined by detecting a blinking rate and a preset value stored in the memory 161, and then obtaining the corresponding brightness weighting value $a''_i$, contrast weighting value $b''_i$, font size weighting value $c''_i$, and other display parameter weighting value from the mapping table of eye movement velocity variations vs. display parameters. The processor 162 adjusts brightness, contrast, font size, and other parameters in accordance with these weighting values. The present method can adjust parameters of the display 10 in the optimum setting in accordance with the user's eye movement velocity. In the following, at step 39, the processor 162 resets the visual performance detected at step 34 and stores the visual performance in the memory 161, such as the viewing distance or blinking rate, as the user's visual performance setting value. And then returns to step 34 and continue to detect the user's visual performance.

The apparatus and method of the present invention can detect visual performance of the display user all the time, and making the user have optimum human visual performance by automatically adjusting display parameters in accordance with the user's visual performance.

While the invention has been described by way of examples and in terms of preferred embodiments, it is to be understood that those who are familiar with the subject art can carry out various modifications and similar arrangements and procedures described in the present invention and also achieve the effectiveness of the present invention. Hence, it is to be understood that the description of the present invention should be accorded with the broadest interpretation to those who are familiar with the subject art, and the invention is not limited thereto.

What is claimed is:

1. An apparatus for automatically adjusting display parameters relying on visual performance, comprising:
   a display used for displaying information for a user to read;
   a detecting system disposed in a predetermined position to detect visual performance of the user; and
   a control system having a mapping table of visual performance variations vs. display parameters, said control system adjusting the display parameters in accordance with a variation of the visual performance and the mapping table, wherein the display parameters include brightness and contrast.

2. The apparatus as claimed in claim 1, wherein said detecting system is a viewing distance detecting system, a blinking rate detecting system, or an eye tracking system.

3. The apparatus as claimed in claim 2, wherein said viewing distance detecting system is a light transmitting/receiving detecting system, an image sensing system, or a sonic ranging system.

4. The apparatus as claimed in claim 2, wherein said blinking rate detecting system is an image sensing system.

5. The apparatus as claimed in claim 2, wherein said eye tracking system is an image sensing system.

6. The apparatus as claimed in claim 1, wherein said control system includes an analog-to-digital converter, a memory and a processor, said analog-to-digital converter converts a visual performance variation signal from said detecting system to a set of digital signals and transmits the set of digital signals to said processor, said memory stores a mapping table of visual performance variations vs. display parameters, and said processor adjusts the display parameters relying on the visual performance variation signal and the mapping table.

7. The apparatus as claimed in claim 6, wherein said detecting system is a viewing distance detecting system, a blinking rate detecting system, or an eye tracking system.

8. The apparatus as claimed in claim 7, wherein said viewing distance detecting system is a light transmitting/receiving detecting system, an image sensing system, or a sonic ranging system.

9. The apparatus as claimed in claim 7, wherein said blinking rate detecting system is an image sensing system.

10. The apparatus as claimed in claim 7, wherein said eye tracking system is an image sensing system.

11. The apparatus as claimed in claim 6, wherein said detecting system is positioned in a non-display area of said display.

12. The apparatus as claimed in claim 1, wherein said detecting system is positioned in a non-display area of said display.

13. A method for automatically adjusting display parameters relying on visual performance, comprising:
   detecting an initial visual performance of a display user;
   continuously detecting visual performance of the user;
   judging whether the visual performance of the user is changed, if the visual performance is not changed, repeating the previous steps, and if the visual performance is changed, determining a variation of the visual performance; and
   adjusting the display parameters relying on a mapping table of visual performance variations vs. display parameters, wherein the display parameters include brightness and contrast.

14. The method as claimed in claim 13, wherein comprising a step for pre-setting the display parameters prior to detecting the initial visual performance of the user.

15. The method as claimed in claim 13, wherein comprising a step for re-detecting the visual performance of the user after adjusting the display parameters.

16. The method as claimed in claim 13, wherein when determining the variation of the visual performance, simultaneously judging whether the visual performance variation exceeds a threshold value, in case that the visual performance variation exceeds the threshold value, sending a warning signal.

17. An apparatus for automatically adjusting display parameters relying on visual performance, comprising:
   a display used for displaying information for a user to read;

a detecting system disposed in a predetermined position to detect visual performance of the user, wherein said detecting system is a blinking rate detecting system or an eye tracking system; and a control system having a mapping table of visual performance variations vs. display parameters, said control system adjusting the display parameters in accordance with a variation of the visual performance and the mapping table.

18. The apparatus as claimed in claim 17, wherein said display parameters include brightness, contrast and font size.

19. The apparatus as claimed in claim 17, wherein said control system includes an analog-to-digital converter, a memory and a processor, said analog-to-digital converter converts a visual performance variation signal from said detecting system to a set of digital signals and transmits the set of digital signals to said processor, said memory stores a mapping table of visual performance variations vs. display parameters, and said processor adjusts the display parameters relying on the visual performance variation signal and the mapping table.

20. The apparatus as claimed in claim 19, wherein said display parameters include brightness, contrast and font size.

* * * * *